(12) United States Patent
Hou

(10) Patent No.: US 12,464,245 B2
(45) Date of Patent: Nov. 4, 2025

(54) 360-DEGREE CAMERA DEVICE

(71) Applicant: MARVEL TECHNOLOGY (CHINA) CO., LTD, Shenzhen (CN)

(72) Inventor: Huawei Hou, Shenzhen (CN)

(73) Assignee: MARVEL TECHNOLOGY (CHINA) CO., LTD, Shenzhen (CN)

( * ) Notice: Subject to any disclaimer, the term of this patent is extended or adjusted under 35 U.S.C. 154(b) by 645 days.

(21) Appl. No.: 17/742,421

(22) Filed: May 12, 2022

(65) Prior Publication Data

US 2023/0269480 A1 Aug. 24, 2023

(30) Foreign Application Priority Data

Feb. 18, 2022 (CN) .......................... 202220333812.8

(51) Int. Cl.
  *H04N 23/698* (2023.01)
  *F16M 11/18* (2006.01)
  *G03B 17/56* (2021.01)
  *H04N 23/50* (2023.01)
  *H04N 23/695* (2023.01)

(52) U.S. Cl.
  CPC .......... *H04N 23/698* (2023.01); *F16M 11/18* (2013.01); *G03B 17/561* (2013.01); *H04N 23/50* (2023.01); *H04N 23/695* (2023.01)

(58) Field of Classification Search
  None
  See application file for complete search history.

(56) References Cited

U.S. PATENT DOCUMENTS

| | | | | |
|---|---|---|---|---|
| 2012/0147132 A1* | 6/2012 | Chen | ...................... | G03B 37/02 |
| | | | | 382/284 |
| 2016/0070154 A1* | 3/2016 | Lai | ...................... | G03B 17/561 |
| | | | | 396/428 |
| 2017/0311116 A1* | 10/2017 | Aga | ...................... | H04W 12/50 |
| 2020/0344385 A1* | 10/2020 | Ujiie | ...................... | G03B 17/561 |
| 2020/0401022 A1* | 12/2020 | Dong | ...................... | F16M 11/10 |
| 2021/0203855 A1* | 7/2021 | Mo | ...................... | H04N 23/62 |
| 2021/0223668 A1* | 7/2021 | Wiley, Jr. | .............. | F16M 11/10 |
| 2021/0286236 A1* | 9/2021 | Kato | .................... | H04N 13/221 |
| 2022/0026907 A1* | 1/2022 | Peng | ...................... | G03B 17/561 |
| 2022/0256090 A1* | 8/2022 | Antonini | ............... | H04N 23/61 |
| 2023/0010779 A1* | 1/2023 | Lin | ...................... | G03B 17/561 |

* cited by examiner

*Primary Examiner* — Daniel T Tekle

(57) ABSTRACT

A 360-degree camera device includes a camera device body, a wireless communication module configured to receive a control signal sent by an external control terminal, and a control system. The camera device body includes a shooting platform, a rotating shooting stand, and a motor configured to drive the rotating shooting stand to rotate around the shooting platform. The control system includes an MCU central processing unit and a control circuit. The MCU central processing unit is provided with control instructions. The control system is electrically connected with the wireless communication module. The MCU central processing unit invokes a corresponding control instruction according to the control signal received by the wireless communication module, and the control circuit controls the motor to drive the rotating shooting stand to rotate in a circumferential direction of the shooting platform.

18 Claims, 8 Drawing Sheets

360-DEGREE CAMERA DEVICE

TECHNICAL FIELD

The present disclosure relates to a technical field of shooting devices, and in particular to a 360-degree camera device.

BACKGROUND

Nowadays, with development of technology, photography and videography have become popular, shooting images is no longer a luxury, and self-portrait is casual. A 360-degree camera device, also known as 360 photo booth, is a platform for rotatably 360-degree shooting. Compared with an ordinary shooting device, the 360-degree camera device is produced to solve needs of 360-degree shooting around an object, and brings further entertainment experience to a user. A motor of the 360-degree camera device drives a shooting rod of the 360-degree camera device to rotate, and the shooting rod rotates to drives a shooting device mounted on the shooting rod to realize 360-degree shooting of the shooting device. However, a rotation speed of the motor of the conventional 360-degree camera device is predetermined and is fixed. The motor drives the shooting rod to rotate around the shooting platform at a constant speed in one direction, resulting in monotonous photography and video effects of the shooting device.

SUMMARY

Aiming at the above problems, the present disclosure proposes a 360-degree camera device, which controls rotation of a motor by an external control terminal, a wireless communication module, and a control system, and enriches functions of the 360-degree camera device.

To achieve the above object, the present disclosure provides a 360-degree camera device. The 360-degree camera device comprises a camera device body, a wireless communication module configured to receive a control signal sent by an external control terminal, and a control system.

The camera device body comprises a shooting platform, a rotating shooting stand, and a motor configured to drive the rotating shooting stand to rotate in a circumferential direction of the shooting platform.

The control system comprises an MCU central processing unit and a control circuit. The MCU central processing unit is provided with control instructions. The control instructions are predetermined and are programmable. The control system is electrically connected with the wireless communication module. The MCU central processing unit invokes a corresponding control instruction according to the control signal received by the wireless communication module. The MCU central processing unit and the control circuit control the motor to drive the rotating shooting stand to rotate in a circumferential direction of the shooting platform.

Furthermore, the control circuit comprises a power supply circuit, a motor driving module, and a motor current detecting circuit. The power supply circuit, the motor driving module, and the motor current detecting circuit are electrically connected with the MCU central processing unit. The MCU central processing unit is configured to control operations of the power supply circuit, the motor driving module, and the motor current detecting circuit; The MCU central processing unit is configured for logic control of the control system.

Furthermore, the control instructions comprise a motor start instruction, a motor forward rotation instruction, a motor reverse rotation instruction, a motor stop instruction, a motor speed increase instruction, a motor speed decrease instruction, and a motor running duration instruction.

Furthermore, the MCU central processing unit is a programmable processor.

Furthermore, the MCU central processing unit regulates control instruction parameters according to the control signal received by the wireless communication module. The control instruction parameter comprise an initial speed value of a motor speed, a step value of the motor speed, and an initial steering value of the motor.

Furthermore, the control instructions comprise a swing instruction. The motor driving module drives the motor according to the swing instruction and the motor drives the rotating shooting stand to swing back and forth within a predetermined arc length range.

Furthermore, the motor current detecting circuit is configured to detect running current of the motor. When the motor current detecting circuit detects that a value of the running current of the motor reaches a blocking current value, the motor current detecting circuit controls the motor to stop.

Furthermore, the camera device body comprises a QR code. The QR code is generated according to a connection address of the wireless communication module. The QR code is configured to be scanned by the external control terminal to establish a connection between the wireless communication module and the external control terminal.

Furthermore, the wireless communication module is selected from a BLUETOOTH communication module, a WIFI communication module, a ZigBee communication module, a wireless radio frequency module, a GPRS communication module, a 4G communication module, an infrared point-to-point communication module, and a UWB wireless carrier communication module.

Furthermore, the rotating shooting stand comprises a first connecting end and a second connecting end. The first connecting end of the rotating shooting stand is configured to connect and mount a shooting device. The shooting platform comprises a connecting portion. The camera device body further comprises a transmission piece, the transmission piece comprises a driving wheel arranged on a power output shaft of the motor, a bearing sleeved on an outer wall of the connecting portion, and a driven wheel sleeved on an outer wall of the bearing. The driving wheel is driven by the motor. The driving wheel drives the driven wheel to rotate. The second connecting end of the rotating shooting stand is connected with an end face of the driven wheel.

Compared with the prior art, the 360-degree camera device of the present disclosure receives the control signal sent by the external control terminal by the wireless communication module. The MCU central processing unit is electrically connected with the wireless communication module, and controls the motor to drive the rotating shooting stand to rotate around the shooting platform according to the control signal received by the wireless communication module, which enriches functions of the 360-degree camera device. Thus, the present disclosure solves a problem that a rotation speed of a motor of a conventional 360-degree camera device is predetermined and fixed and the motor drives the shooting rod to rotate around the shooting platform in the circumferential direction, and can only rotate at a constant speed in one direction, resulting in monotonous shooting effects of the conventional 360-degree camera device.

Figure 1:
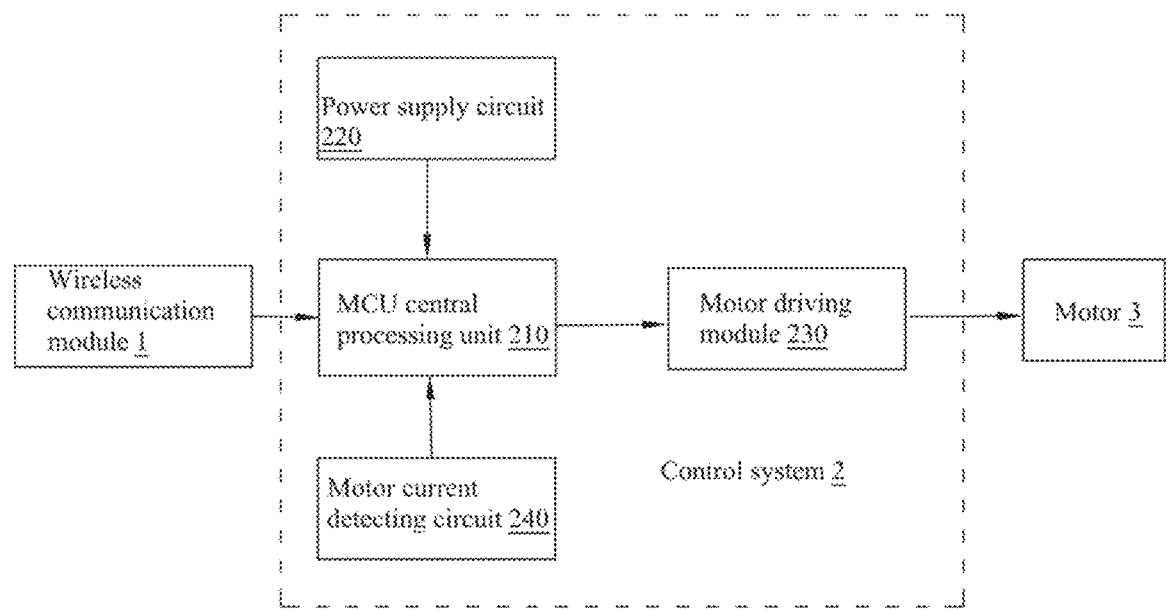
FIG. 1 is a structural block diagram of a wireless communication module, a control system, and a motor of a 360-degree camera device of the present disclosure.

In the drawings: 1-wireless communication module; 2-control system; 210-MCU central processing unit; 220-power supply circuit; 230-motor driving module; 240-motor current detecting circuit; 3-motor; 4-rotating shooting stand; 410-first connecting end; 420-second connecting end; 5-shooting platform; 510-connecting portion; 6-transmission piece; 610-driving wheel; 620-bearing; 630-driven wheel; 7-control box.

DETAILED DESCRIPTION

Figure 2:
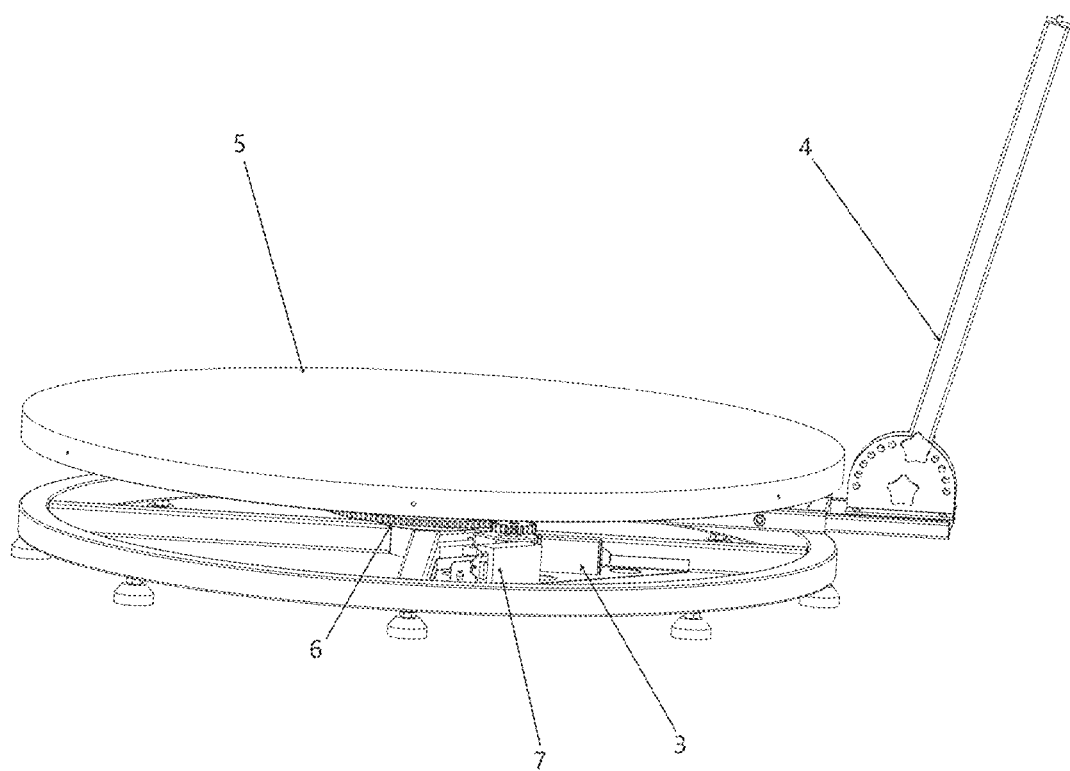
FIG. 2 is a schematic diagram of a camera device body of the 360-degree camera device of the present disclosure.
Figure 3:
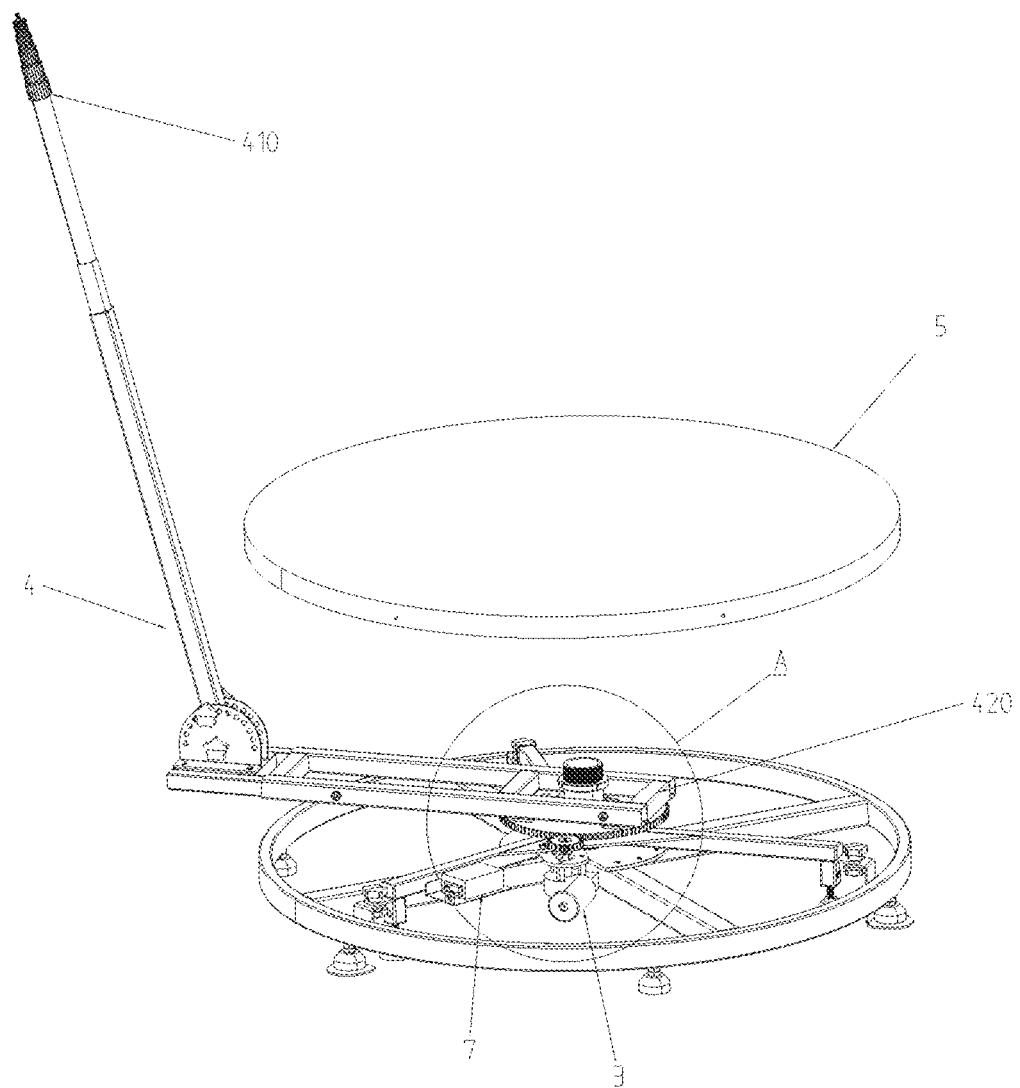
FIG. 3 is an exploded schematic diagram of the camera device body of the 360-degree camera device of the present disclosure.
Figure 4:
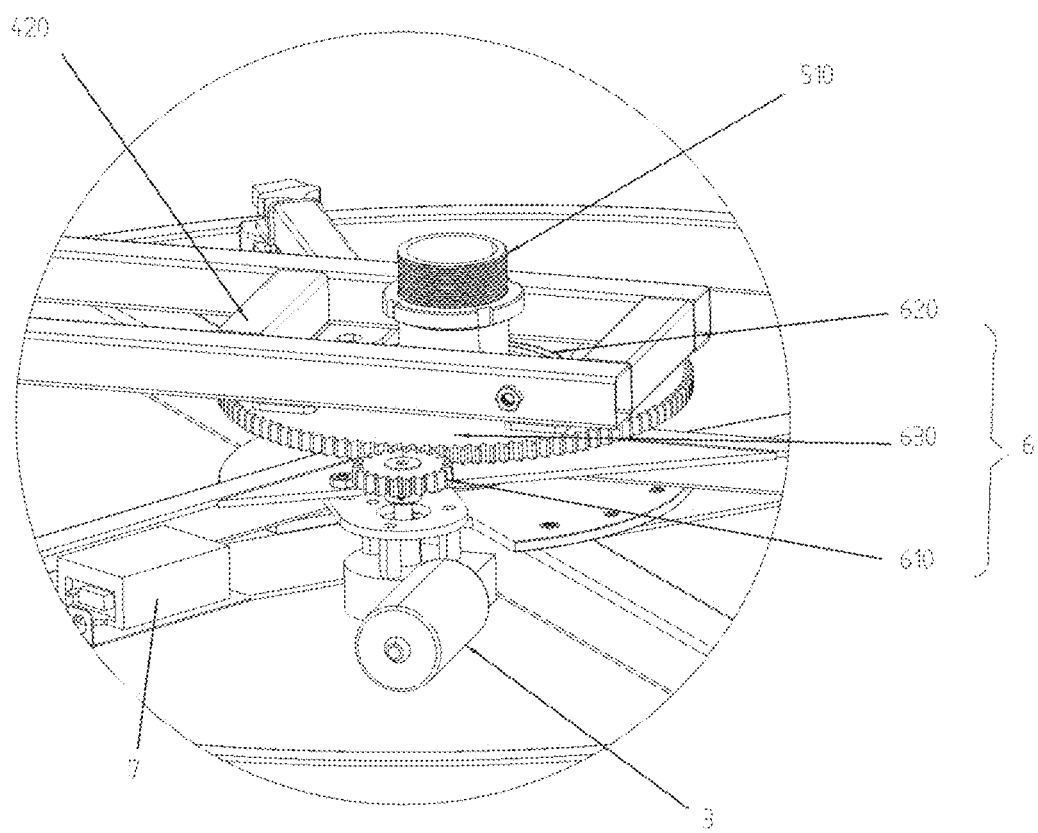
FIG. 4 is an enlarged schematic diagram of portion A shown in FIG. 3.
Figure 5:
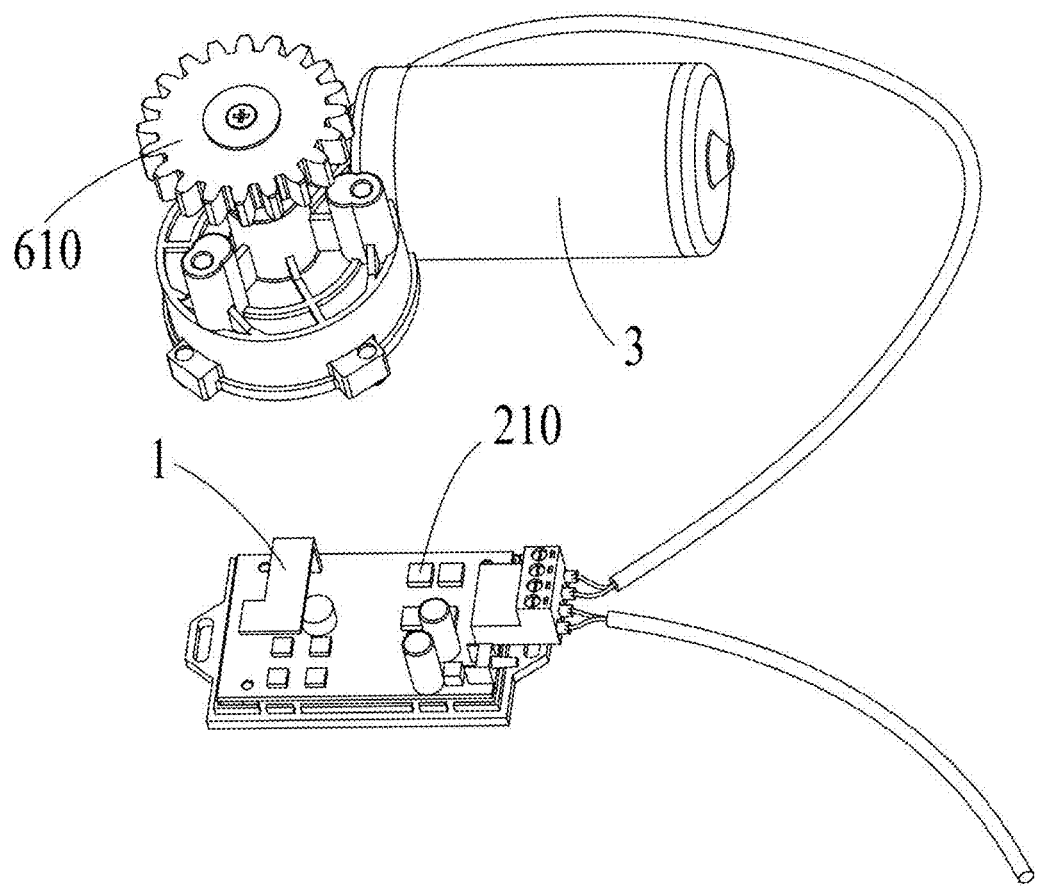
FIG. 5 is a schematic diagram showing connection between the motor, a driving wheel, the wireless communication module, and a MCU central processing unit of the 360-degree camera device of the present disclosure.
Figure 6:
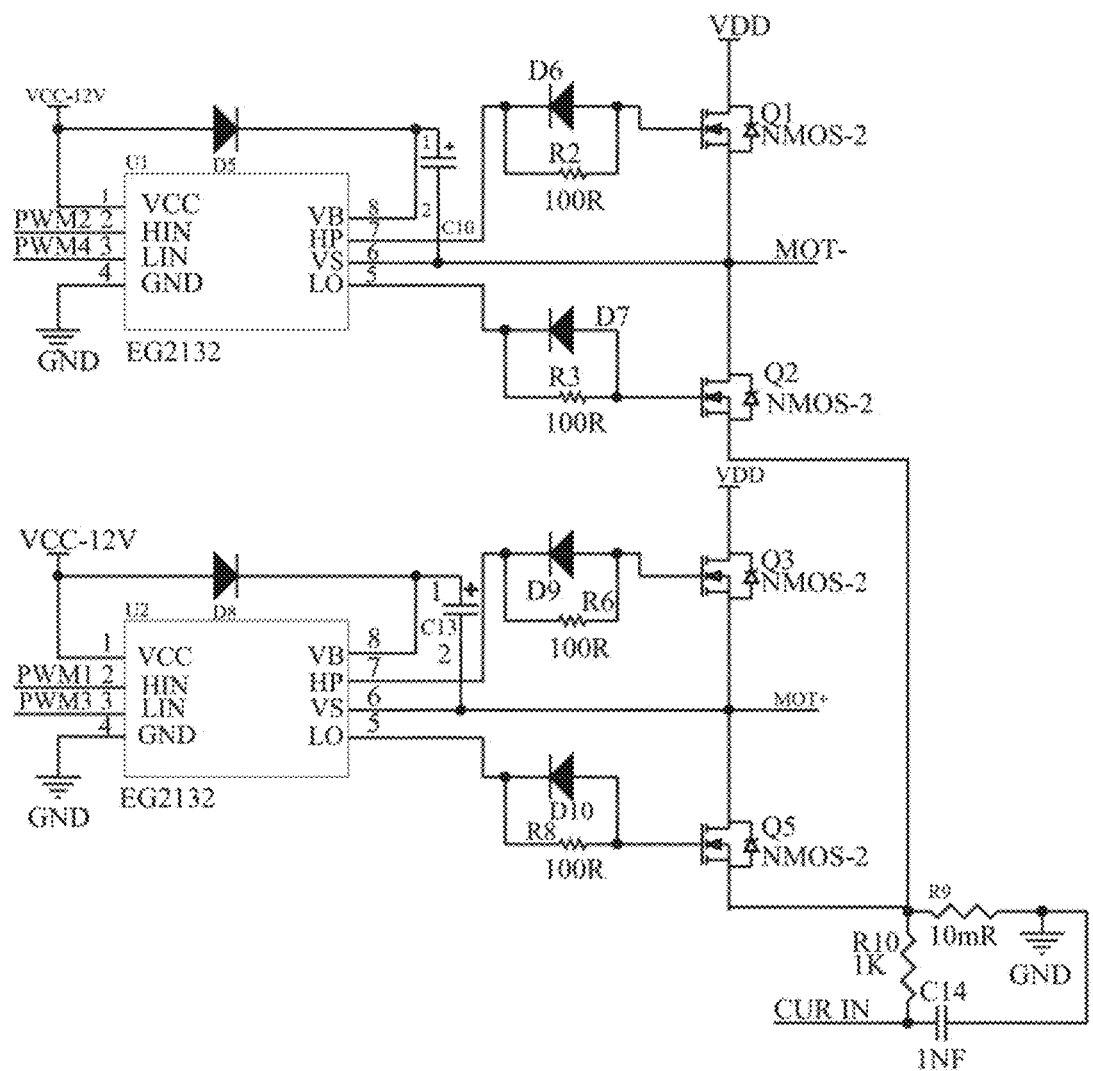
FIG. 6 is a schematic diagram of a circuit connection of a motor driving module of the 360-degree camera device of the present disclosure.
Figure 7:
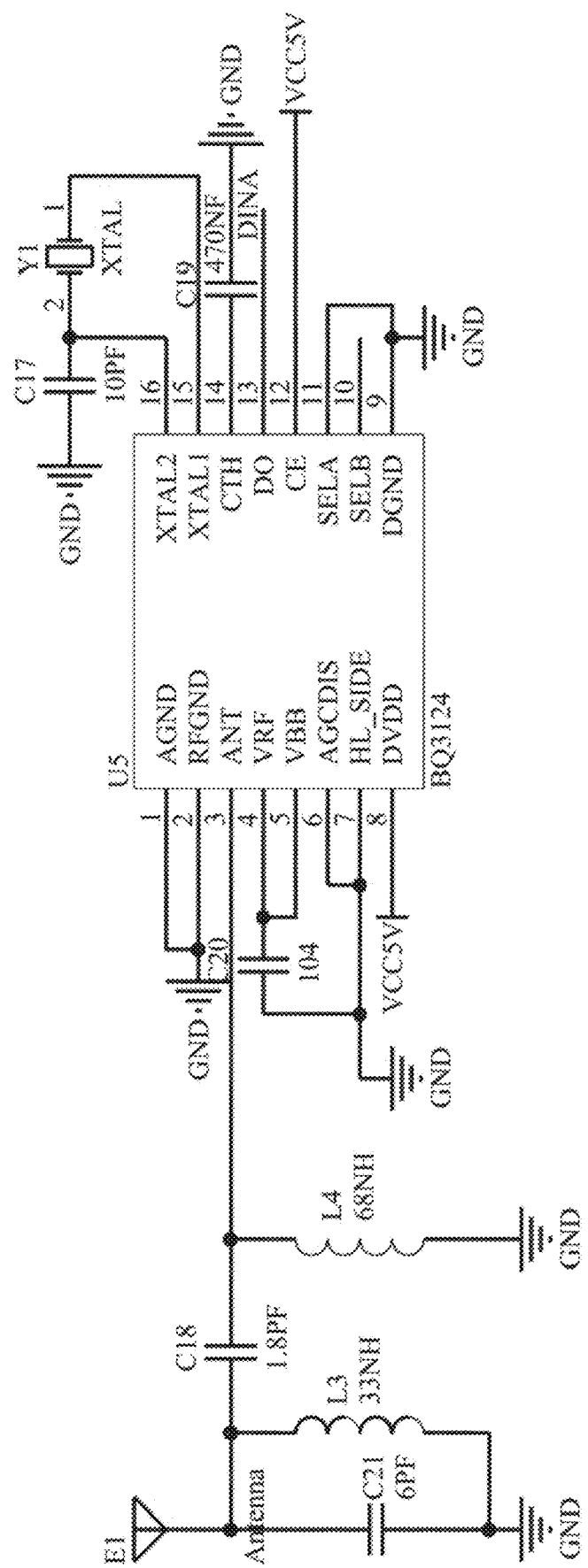
FIG. 7 is a schematic diagram showing connection of a power supply circuit of the 360-degree camera device of the present disclosure.
Figure 8:
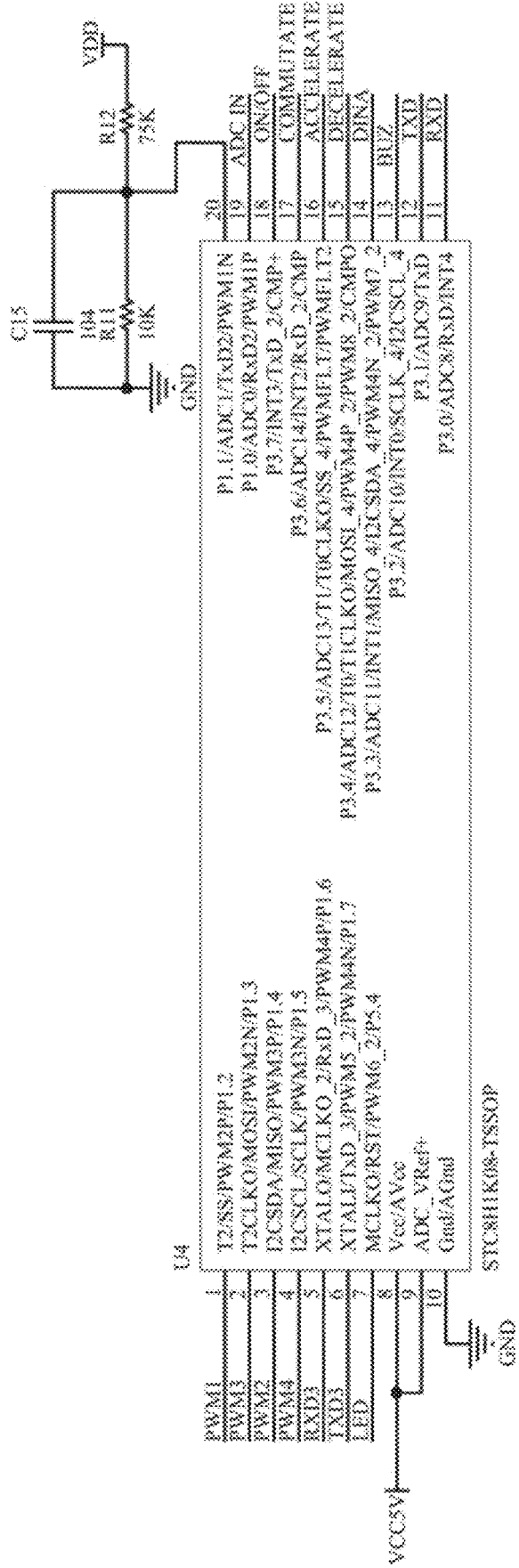
FIG. 8 is a schematic diagram of a circuit of the MCU central processing unit of the 360-degree camera device of the present disclosure.
Figure 9:
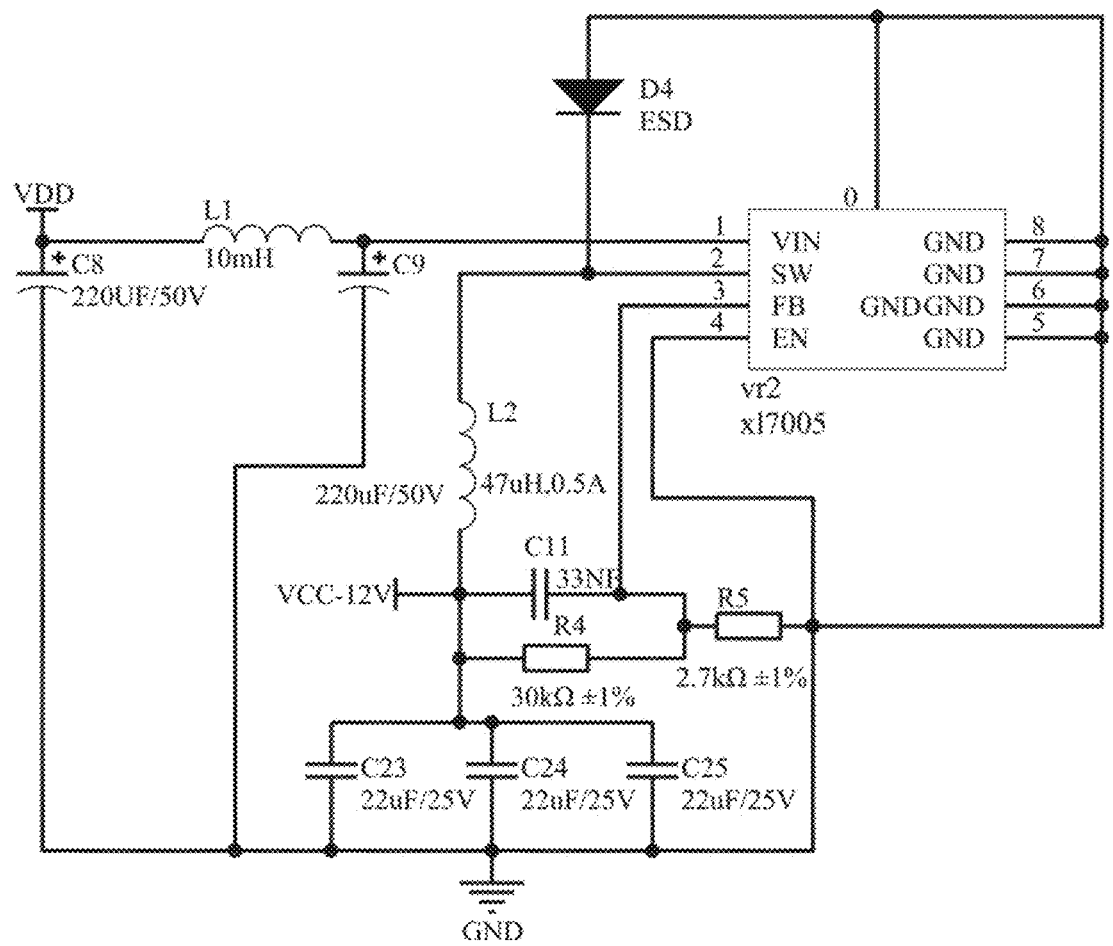
FIG. 9 is a schematic diagram showing connection of a motor current detecting circuit of the 360-degree camera device of the present disclosure.

As shown in FIGS. 1-9, the present disclosure provides a 360-degree camera device. The 360-degree camera device comprises a camera device body, a wireless communication module 1 and a control system 2. The camera device body comprises a shooting platform 5, a rotating shooting stand 4, and a motor 3 configured to drive the rotating shooting stand 4 to rotate in a circumferential direction of the shooting platform 5. The wireless communication module 1 is configured to receive a control signal sent by an external control terminal. The control system 2 comprises an MCU central processing unit 210 and a control circuit. The MCU central processing unit 210 is provided with control instructions. The control instructions are predetermined and are programmable. The control system 2 is electrically connected with the wireless communication module 1. The MCU central processing unit 210 invokes a corresponding programmable control instruction according to the control signal received by the wireless communication module 1, and the MCU central processing unit 210 and the control circuit control the motor 3 to drive the rotating shooting stand 4 to rotate in the circumferential direction of the shooting platform 5, The shooting platform 5 is configured for a user to stand on. The rotating shooting stand 4 is configured to connect and mount a shooting device, such as a mobile phone holding support, a camera, a fill light and other peripherals.

The external control terminal may be a mobile device, a personal computer (PC) device, a remote control device, or other intelligent communication devices. An application or a software client that is connected and communicated with the wireless communication module 1 is installed in the external control terminal, so the control system 2 is controlled to improve the convenience of use. The present disclosure hereafter takes the application installed in the external control terminal as an example to illustrate the working principle of the external control terminal. It should be understood that the wording principle of the software terminal is similar to that of the application, which is not repeatedly illustrated.

According to the control signal received by the wireless communication module 1, the control system 2 controls the motor 3 to drive the rotating shooting stand 4 to rotate in the circumferential direction of the shooting platform 5. For example, the control system 2 controls a rotation direction, a rotation speed, and a rotation duration of the motor 3. Therefore, a rotation direction, a rotation speed, a rotation duration, and a rotation distance of the rotating shooting stand 4 are flexibly controlled.

As shown in FIGS. 1, and 5-9, the control circuit comprises a power supply circuit 220, a motor driving module 230, and a motor current detecting circuit 240. The power supply circuit 220, the motor driving module 230, and the motor current detecting circuit 240 are electrically connected with the MCU central processing unit 210. The MCU central processing unit 210 is configured to control operations of the power supply circuit, the motor driving module, and the motor current detecting circuit. The MCU central processing unit is configured for logic control of the control system.

Optionally, the motor driving module 230 is an H-bridge chip.

As shown in FIGS. 1 and 5-9, the MCU central processing unit 210 invokes a corresponding control instruction according to the control signal received by the wireless communication module 1. The control instructions comprise a motor start instruction, a motor forward rotation instruction, a motor reverse rotation instruction, a motor stop instruction, a motor speed increase instruction, a motor speed decrease instruction, and a motor running duration instruction.

Through the control instructions, the motor 3 is controlled to start, rotate clockwise, rotate counterclockwise, stop rotating, accelerate rotation, decelerate rotation, and rotate at timed, and then the rotating shooting stand 4 is rotated around the shooting platform 5 to achieve the corresponding rotation effect. These control instructions can be used in combination to achieve control effects that cannot be achieved by an ordinary motor controlled by a remote control.

As shown in FIGS. 1 and 5-9, the MCU central processing unit 210 is a programmable processor.

The MCU central processing unit 210 regulates a control instruction parameter according to the control signal received by the wireless communication module 1. The control instruction parameter comprise an initial speed value of a motor speed, a step value of the motor speed, and an initial steering value of the motor.

The MCU central processing unit 210 is the programmable processor, which is selected from a single chip microcomputer or a programmable logic controller (PLC).

The MCU central processing unit 210 is provided with some predetermined control instructions. If the control signal received by the wireless communication module 1 corresponds to the corresponding control instruction, the MCU central processing unit 210 invokes the corresponding control instruction to realize corresponding function after processing. For example, the application installed in the external control terminal sends a motor speed acceleration control signal to the wireless communication module 1, and the wireless communication module 1 transmits the motor speed acceleration control signal to the MCU central processing unit 210 of the control system 2. The MCU central processing unit 210 processes the motor speed acceleration control signal and converts the motor speed acceleration control signal into the motor speed increase instruction, so that the motor driving module 230 controls the motor 3 to speed up the rotation speed of the motor 3.

Because the MCU central processing unit 210 is the programmable processor, the user is also able to program and add other control instructions other than the predetermined control instructions according to needs, which expands a variety of control and setting methods. The user is further able to program and update programs of the programmable processor (the MCU central processing unit 210), and burn written motor control program instructions to the MCU central processing unit 210, which expands the control method and improves scalability and flexibility of the control method. For example, the application installed in the external control terminal is controlled to send a motor start signal to the wireless communication module 1, and the MCU central processing unit 210 converts the motor start signal into the motor start instruction, the motor driving module controls the motor 3 to rotate. When the motor 3 is started for the first time, whether the motor rotates clockwise or counterclockwise is controlled through the external control terminal. The application sends the control signals to adjust the control instruction parameters and modify the required initial steering value of the motor 3.

In addition, the rotation speed of the motor 3 has gear levels. A rotating speed difference between a gear of the motor to an adjacent gear is defined as a gear step value. A acceleration parameter is adjusted by sending a speed regulation control instruction data parameter to the wireless communication module 1 through the application installed in the external control terminal. Therefore, a stepping speed of the motor is controlled, custom functions are enriched, and the controllability is enhanced. The application installed in the external control terminal also sends the control signal to the wireless communication module 1 to adjust the control instruction parameters and therefore control the initial speed value of the motor speed. Namely, an initial rotation speed of the motor 3 is controlled by the application, which enhances and enriches functions and effects of the motor 3 driving the rotating shooting stand 4 to rotate around the shooting platform 5. Therefore, by adopting the technical solution, the rotation speed of the motor 3 and step value of the motor speed are adjusted according to characteristics of the motor 3, which effectively reduces the speed and reduce noise, so that the motor 3 runs in a good state.

As shown in FIGS. 1-8, the control instructions comprise a swing instruction. The motor driving module drives the motor 3 according to the swing instruction to drive the rotating shooting stand 4 to swing back and forth within a predetermined arc length range.

The application installed in the external control terminal sends a clockwise rotation signal to the wireless communication module 1, then the MCU central processing unit 210 converts the clockwise rotation signal into the motor forward rotation instruction, and the motor driving module drives the motor to rotate clockwise. The application installed in the external control terminal sends a counterclockwise rotation signal to the wireless communication module 1, the MCU central processing unit 210 converts the counterclockwise rotation signal into the motor reverse rotation instruction, and the motor driving module drives the motor 3 to rotate counterclockwise.

The swing instruction realizes the swing mode by swinging the shooting device carried by the camera device body, and the swing instruction is realized by sending clockwise and counter clockwise rotation signals alternately by the application, and the MCU central processing unit 210 sends the forward and reverse rotation instructions alternately at timed. For example, in period 1, the motor forward rotation instruction is sent, and the motor rotates clockwise. In period 2, the motor reverse rotation instruction is sent, and the motor rotates counterclockwise. In period 3, the motor forward rotation instruction is sent, and the motor rotates clockwise, and so on. As the rotation directions of the motor are alternately changed, the MCU central processing unit 210 sends the alternately forward and reversed rotation instruction to the motor driving module, and the motor 3 rotates clockwise and counterclockwise alternately to realize the function of swinging rotation.

In some embodiments, the rotation speed, steering, star, stop, and rotation duration of the motor 3 are all achieved by sending the control signal to the wireless communication module 1 through the application installed in the external control terminal, and by regulating the motor 3 through the control system 2, An outer diameter of a power output shaft of the motor 3 determines an arc length of rotation of the rotating shooting stand 4 connected to the motor 3. After the power output shaft of the motor 3 rotates for a certain number of times, the rotating shooting stand 4 rotates around the shooting platform 5 in the circumferential direction of the shooting platform 5, and the arc length through which the rotating shooting stand 4 rotates is fixed. Therefore, when the arc length of the rotation of the rotating shooting stand 4 is determined, the power output shaft of the motor 3 rotates forward for a predetermined number of times, then rotates reverses for the predetermined number of times, and rotates forward for the predetermined number of times again. In this way, reciprocating swinging of the rotating shooting stand 4 within the predetermined arc length range is realized. The shooting device mounted on the rotating shooting stand 4 can also shoot images with corresponding effects, which improves the use experience of the shooting device.

As shown in FIGS. 1-9, the motor current detecting circuit 240 is configured to detect running current of the motor 3. When the motor current detecting circuit 240 detects that a value of the running current of the motor 3 reaches a blocking current value, the motor current detecting circuit controls the motor 3 to stop.

When the rotating shooting stand 4 is blocked by external obstacles and is unable to rotate circumferentially around the shooting platform 5, the rotation of the motor 3 is also affected. However, the power supply is kept supplying power to the motor 3, which is likely to cause damage to the motor 3. At this time, the value of the running current in the circuit connected to the motor 3 is defined as the blocking current value. When the motor current detecting circuit 240 detects that the value of the running current reaches the blocking current value, the motor 3 is controlled to stop in time to protect the service life of the motor 3.

Since the MCU central processing unit 210 is the programmable processor, the blocking current value is dynamically set to the motor current detecting circuit 240 through programming, so that the motor 3 triggers protection mechanism when the motor 3 is blocked by an external force during a running process. The motor 3 automatically stops rotating, so the motor 3 is protected and is not damaged.

Optionally, the camera device body comprises a quick response (QR) code (not shown in the drawings). The QR code is generated according to a connection address of the wireless communication module 1. The QR code is configured to be scanned by the external control terminal to establish a connection between the wireless communication module 1 and the external control terminal. The application installed in the external control terminal is connected with the 360-degree camera device by scanning the QR code. Compared with a method of searching for the 360-degree camera device through the wireless communication protocol for matching and connecting, a method of establishing the connection with the 360-degree camera device by scanning the QR code is more accurate and faster.

In some embodiments, when multiple external control terminals try to connect to the 360-degree camera device, the application of an idle external control terminal actively disconnects from the 360-degree camera device, so that the application installed in the external control terminal that needs to work is communicated with the 360-degree camera device, which prevents a situation where the application of an external control terminal is exclusively connected with the 360-degree camera device.

In some embodiments, the application installed in the external control terminal has functions such as system initialization, device search, scan code for connection, device control, and shooting through matching with the 360-degree camera device.

In some embodiments, the QR code is replaced by a near field communication (NFC) tag. The NFC tag contains the connection address of the wireless communication module 1, and the application installed in the external control terminal establishes the connection with the wireless communication module 1 by contacting the NFC tag.

In some embodiments, the QR code is a sticker or a spray printing. The QR code is disposed on the rotating shooting stand 4 or the shooting platform 5 of the camera device body.

Optionally, the wireless communication module is selected from a BLUETOOTH communication module, a WIFI communication module, a ZigBee communication module, a wireless radio frequency module, a GPRS communication module, a 4G communication module, an infrared point-to-point communication module, and a UWB wireless carrier communication module.

The wireless communication module 1 of the 360-degree camera device supports a variety of wireless communication protocols to connect and communicate with the application installed in the external control terminal.

As shown in FIGS. 2-5, the rotating shooting stand 4 comprises a first connecting end 410 and a second connecting end 420. The first connecting end 410 of the rotating shooting stand 4 is configured to connect and mount a shooting device. The shooting platform 5 comprises a connecting portion 510. The camera device body further comprises a transmission piece 6, the transmission piece 6 comprises a driving wheel 610 arranged on the power output shaft of the motor 3, a bearing 620 sleeved on an outer wall of the connecting portion 610, and a driven wheel 630 sleeved on an outer wall of the bearing 620. The driving wheel 610 is driven by the motor 3. The driving wheel 610 drives the driven wheel 630 to rotate, the second connecting end 420 of the rotation shooting support 4 is connected with an end face of the driven wheel 630.

In some embodiments, the connecting portion 510 is a shaft-shaped structure.

In some embodiments, due to a spatial arrangement of the 360-degree camera device, the power output shaft of the motor 3 is indirectly connected to drive the rotating shooting stand 4 through the transmission piece 6. The transmission piece 6 may be a gear group connecting the rotating shooting stand 4 and the power output shaft of the motor 3. The transmission member 6 may also be a transmission wheel, or a transmission belt group, so as to realize connection between the rotating shooting stand 4 and the power output shaft of the motor 3.

In some embodiments, the application installed in the external control terminal is connected to control the 360-degree camera device while the external control terminal is connected with the first connection terminal 410 of the rotating shooting stand 4. The external control terminal can simultaneously turn on a camera of the external control terminal for synchronous shooting while controlling the rotation of the rotating shooting stand 4, so the rotation of the rotating shooting stand 4 is closely matched with the shooting of the camera, and effect and interest of the shooting work are increased.

In some embodiments, the application installed in the external control terminal has a face recognition function. During a shooting process of the external control terminal mounted on the rotating shooting stand 4 around the shooting table 5, when the application installed in the external control terminal recognizes a face image, the application sends the control signal to the wireless communication module 1 to make the motor 3 decelerate, so as to realize close-up photography of a human face in slow motion.

In some embodiments, a shooting function of the application installed in the external control terminal comprises an image special effect function and an AR "flying all over the sky" special effect. By using the AR "flying all over the sky" special effect, flying objects, such as petals, leaves, butterflies, and other custom images, are set in a shooting image. During the shooting process of the application installed in the external control terminal, the flying effect is set and the flying objects are added to a current video or the shooting image according to the user's operations. This technical solution makes the photographed works beautiful and funny.

As shown in FIGS. 2-5, in some embodiments, the wireless communication module 1 and the control system 2 is integrate on a circuit board. The circuit board is arranged in a control box 7. The control box 7 provides support and protection for each module, circuit, and unit, and is waterproof and dustproof.

The wording principle of the present disclosure is as follow:

The control box 7 is connected to a power supply. The wireless communication module 1 and the control circuit of the control system 2 are initialized, and the application in the external control terminal searches for at least one currently online 360-degree camera device through the wireless communication protocol. When at least one 360-degree camera device is searched, the user is able to select the 360-degree camera device to be connected by clicking a specific device name of the 360-degree camera device displayed on the external control terminal. After the application establishes the connection with the wireless communication module 1 of the 360-degree camera device, it enters a data signal communication preparation state.

Then a start button on the application installed in the external control terminal is clicked, the application in the external control terminal sends the control signal of the motor 3 to the control box 7 according to predetermined control commands, and the wireless communication module 1 in the control box 7 obtains the control signal and transmits it to the control system 2. The control system 2 performs processing, analysis, and sends the motor start instruction to the motor 3. The motor 3 starts to run, and rotates according to a default state. When a stop button on the application installed in the external control terminal is clicked, the motor 3 stops running.

Optionally, the rotation speed of motor 3 is divided into 8 gears, and the rotation speed gradually increases from gears 1 to 8. By clicking the gear control buttons on the application installed in the external control terminal, the gear of the rotation speed is selected. Then the application installed in the external control terminal sends the corresponding speed gear signal according to the predetermined control instructions of the MCU central processing unit 210. The wireless communication module 1 receives the control signal and transmits it to the control system 2. The motor driving module 230 controls the rotation speed of the motor 3 to be the rotation speed corresponding to the specific gear.

By clicking a timing button on the application installed in the external control terminal, the application sends a time control signal according to the motor running duration instruction of the MCU central processing unit 210. After receiving the time control signal, the wireless communication module 1 transmits the time control signal to the control system. The control system 2 then controls a rotation time of the motor three. The rotation time of the power output shaft of three starts to count down, and when the time reaches the set rotation time, the motor 3 is stopped.

By clicking a clockwise direction button on the application installed in the external control terminal, the application sends the clockwise rotation signal according to a clockwise control instruction predetermined in the MCU central processing unit 210. After receiving the clockwise rotation signal, the wireless communication module 1 transmits it to the control system 2. The control system 2 controls the clockwise rotation direction of the motor 3. The motor 3 starts to rotate clockwise, which drives the rotating shooting stand 4 to rotate clockwise. The clockwise control instruction is the motor forward rotation instruction.

By clicking a counterclockwise direction button on the application of installed in the external control terminal, the application sends the counterclockwise rotation signal according to a counterclockwise control instruction predetermined by the MCU central processing unit 210. After receiving the counterclockwise rotation signal, the wireless communication module 1 transmits it to the control system 2. The control system 2 controls the counterclockwise rotation direction of the motor 3. The motor 3 starts to rotate counterclockwise, which drives the rotating shooting stand 4 to rotate counterclockwise. The counterclockwise control instruction is the motor reverse rotation instruction.

The application installed in the external control terminal controls the acceleration rotation of the motor 3 by sending an incremental speed gear signal, and the MCU central processing unit 210 indirectly receives the incremental speed gear signal at regular intervals. For example, the rotation speed of the motor is controlled to be in gear 1 in period 1, the rotation speed of the motor is controlled to be in gear 2 in period 2, and the rotation speed of the motor is controlled to be in gear 3 in period 3, and so on. With the gears of the rotation speed increases, the MCU central processing unit 210 sends the motor speed increase instruction to the motor 3 to gradually increase the rotation speed, and the motor 3 gradually speeds up, realizing accelerated rotation of the motor 3.

The application installed in the external control terminal controls the deceleration rotation of the motor 3 by sending a decreasing speed gear signal. The MCU central processing unit 210 indirectly receives the decreasing speed gear signal at regular intervals. For example, the rotation speed of the motor is controlled to be in gear 3 in the period 1, the rotation speed of the motor is controlled to be in gear 1 in period 2, and the rotation speed of the motor is controlled to be in gear 1 in period 3, and so on. With the gears decreases, the MCU central processing unit 210 sends the motor speed decrease instruction to the motor 3 to gradually decrease the rotation speed, and rotation speed of the motor 3 gradually slows down, realizing the decelerated rotation of the motor 3.

The clockwise rotation signal and the counterclockwise rotation signal are indirectly alternately sent to the MCU central processing unit 210 through timing. For example, the clockwise rotation signal is sent in the period 1, the counterclockwise rotation signal is sent in period 2, the clockwise rotation signal is sent in the period 3, and so on. The MCU central processing unit 210 sends the motor forward rotation command and the motor reverse rotation command to the motor 3 alternately, so the motor 3 rotates forward and reverse alternately, which realizes the swing rotation of the rotating shooting stand 4.

The application installed in the external control terminal sends a blocking current value setting signal, and then the MCU central processing unit 210 stores data of the blocking current value. If the external objects obstruct the rotation of the rotating shooting stand 4, the running current of the motor 3 increases. When the value of the running current of the motor 3 reached the blocking current value, the motor 3 stops rotating automatically to avoid damage to the motor 3, which prolongs the service life of the motor 3.

The application installed in the external control terminal sends a motor initial speed value setting signal to the wireless communication module. The MCU central processing unit 210 stores the initial speed value of the motor speed. The initial speed value of the motor speed is defined as gear 1. When a gear control button on the application is clicked, the motor starts to rotate at a lowest speed. The speed value of the lowest speed of the motor is equal to the initial speed value of the motor speed. With the gear increases, the rotation speed of the motor 3 increases. The gear control buttons are configured to adjust the rotation speed of the motor 3, so that the motor 3 can run at a best speed state.

A gear step value is a speed value of the motor increased by one gear. The gear step value cannot be modified by a conventional remote control. However, the fear step value is modified by controlling the control commands of the application installed in the external control terminal. The application is controlled to indirectly send a gear step value setting signal to the MCU central processing unit 210, and the MCU central processing unit 210 stores the gear step value. When the rotation speed of the motor 3 is increased by one gear, the rotation speed of the motor 3 is increased by one gear step value. By setting the initial speed value of the motor speed and setting the gear step value of the motor, the rotation speed of the motor 3 is gradually increased until reaches the optimum state. For a motor with too fast speed and too much noise, the rotation speed thereof can be adjusted by setting the gear step value to achieve the purpose of reducing speed and noise, which also prolongs the service life of the motor 3.

The application installed in the external control terminal is able to obtain the connection address of the wireless communication module 1 by scanning the QR code. The application is able to realize the connection with the 360-degree camera device by scanning the QR code. When multiple external control terminals try to connect to the same camera device body, the applications determine whether the camera device body is running. If the ring camera device is in an idle state and is not running, a current application with a fastest connection speed establishes a new connection with the camera device body. At this time, the prior application actively disconnects the camera device body. Therefore, when the prior application does not control the camera device body, another application is able to connect with the camera device body, avoiding the situation where one application is exclusively connected with the camera device body.

In summary, the 360-degree camera device of the present disclosure receives the control signal sent by the external control terminal by the wireless communication module 1. The control system 2 is electrically connected with the wireless communication module 1, and controls the motor 3 to drive the rotating shooting stand 4 to rotate around the shooting platform 5 according to the control signal received by the wireless communication module 1, which enriches functions of the 360-degree camera device. Thus, the present disclosure solves a problem that a rotation speed of a motor of the conventional 360-degree camera device is predetermined and fixed and the motor drives the shooting rod to rotate around the shooting platform in the circumferential direction, and can only rotate at a constant speed in one direction, resulting in monotonous shooting effects of the conventional 360-degree camera device. The present disclosure further solves the problem that the conventional handheld remote control can only control the motor to drive the shooting rod through remote control buttons. The control method is single, the control content is small, and the remote control cannot carry out richer and more effective control. The present disclosure further solves problems that rotation speed and gear step value of the convention motor are fixed after leaving the factory and are not programmable to reduce the rotation speed and noise.

What is claimed is:

1. A 360-degree camera device, comprising:
   a camera device body;
   a wireless communication module configured to receive a control signal sent by an external control terminal; and
   a control system;
   wherein the camera device body comprises a shooting platform, a rotating shooting stand, and a motor configured to drive the rotating shooting stand to rotate in a circumferential direction of the shooting platform;
   wherein the control system comprises a microcontroller (MCU) central processing unit and a control circuit; the MCU central processing unit is provided with control instructions; the control instructions are predetermined and are programmable; the control system is electrically connected with the wireless communication module; the MCU central processing unit invokes a corresponding control instruction according to the control signal received by the wireless communication module, and the MCU central processing unit and the control circuit control the motor to drive the rotating shooting stand to rotate in the circumferential direction of the shooting platform;
   a motor current detecting circuit, wherein the motor current detecting circuit is configured to detect running current of the motor; when the motor current detecting circuit detects that a value of the running current of the motor reaches a blocking current value, the motor current detecting circuit controls the motor to stop;
   wherein the MCU central processing unit regulates control instruction parameters according to the control signal received by the wireless communication module and dynamically adjusts parameters of the motor; the control instruction parameters comprise an initial speed value of a motor speed, a step value of the motor speed, and an initial steering value of the motor; and
   wherein the control system interact with the external terminal in real time via the wireless communication for multimodally controlling the rotating shooting stand.

2. The 360-degree camera device according to claim 1, wherein the control circuit comprises a power supply circuit and a motor driving module; the power supply circuit, the motor driving module, and the motor current detecting circuit are electrically connected with the MCU central processing unit; the MCU central processing unit is configured to control operations of the power supply circuit, the motor driving module, and the motor current detecting circuit; the MCU central processing unit is configured for logic control of the control system, wherein the motor current detecting circuit comprises current detecting sensor and signal processing module, the motor current detecting circuit is configured to detect running current of the motor, when the motor current detecting circuit detects that a value of the running current of the motor reaches a blocking current value, the motor current detecting circuit controls the motor to stop.

3. The 360-degree camera device according to claim 1, wherein the control instructions comprise a motor start instruction, a motor forward rotation instruction, a motor reverse rotation instruction, a motor stop instruction, a motor speed increase instruction, a motor speed decrease instruction, a swing instruction, and a motor running duration instruction, wherein the motor driving module drives the motor according to the swing instruction and the motor drives the rotating shooting stand to swing back and forth within a predetermined arc length range, and the control instructions is configured to be combined controlled by the external terminal and transferred to the MCU central processing unit.

4. The 360-degree camera device according to claim 1, wherein the MCU central processing unit is a programmable processor, and the MCU central processing unit is configured to be programmed to add other control instructions and update programs of the programmable processor, and the other control instructions comprise dynamically path setting instruction, speed tapering controlling instruction and rotating direction instruction.

5. The 360-degree camera device according to claim 1, wherein the control instructions comprise a swing instruction; the motor driving module drives the motor according to the swing instruction and the motor drives the rotating shooting stand to swing back and forth within a predetermined arc length range.

6. The 360-degree camera device according to claim 5, wherein when the external control terminal sends a clockwise rotation signal to the wireless communication module, the MCU central processing unit converts the clockwise rotation signal into the motor forward rotation instruction, and the motor driving module drives the motor to rotate clockwise, when the external control terminal sends a counterclockwise rotation signal to the wireless communication module, the MCU central processing unit converts the counterclockwise rotation signal into the motor reverse rotation instruction, and the motor driving module drives the motor to rotate counterclockwise.

7. The 360-degree camera device according to claim 5, the swing instruction realizes the swing mode by swinging the shooting device carried by the camera device body, and the swing instruction is realized by sending clockwise and counter clockwise rotation signals alternately by the application, and the MCU central processing unit sends the alternately forward and reversed rotation instruction to the motor driving module, and the motor rotates clockwise and counterclockwise alternately to realize the function of swinging rotation.

8. The 360-degree camera device according to claim 1, wherein the camera device body comprises a quick response (QR) code; the QR code is generated according to a connection address of the wireless communication module; the QR code is configured to be scanned by the external control terminal to establish a connection between the wireless communication module and the external control terminal.

9. The 360-degree camera device according to claim 1, wherein the wireless communication module is selected from a BLUETOOTH communication module, a WIFI communication module, a ZigBee communication module, a wireless radio frequency module, a GPRS communication module, a 4G communication module, an infrared point-to-point communication module, and a UWB wireless carrier communication module.

10. The 360-degree camera device according to claim 1, wherein the rotating shooting stand comprises a first connecting end and a second connecting end; the first connecting end of the rotating shooting stand is configured to connect and mount a shooting device; the shooting platform comprises a connecting portion; the camera device body further comprises a transmission piece, the transmission piece comprises a driving wheel arranged on a power output shaft of the motor, a bearing sleeved on an outer wall of the connecting portion, and a driven wheel sleeved on an outer wall of the bearing; the driving wheel is driven by the motor; the driving wheel drives the driven wheel to rotate; the second connecting end of the rotating shooting stand is connected with an end face of the driven wheel.

11. The 360-degree camera device according to claim 1, wherein the control system drives the motor to rotate though an H-bridge chip.

12. The 360-degree camera device according to claim 1, wherein a rotation speed of the motor has gear levels, a rotating speed difference between a gear of the motor to an adjacent gear is defined as a gear step value, a acceleration parameter is adjusted by sending a speed regulation control instruction data parameter to the wireless communication module through application installed in the external control terminal.

13. The 360-degree camera device according to claim 12, wherein the external control terminal sends a control signal to the wireless communication module to adjust the control instruction parameters and control an initial speed value of the motor speed, the initial rotation speed of the motor is controlled by the application installed in the external control terminal to enhance and enrich functions and effects of the motor driving the rotating shooting stand to rotate around the shooting platform.

14. The 360-degree camera device according to claim 1, wherein the external control terminal sends a motor initial speed value setting signal to the wireless communication module, and the MCU central processing unit stores the initial speed value of the motor speed, the initial speed value of the motor speed is defined as gear, and a speed value of the lowest speed of the motor is equal to the initial speed value of the motor speed.

15. The 360-degree camera device according to claim 1, wherein the camera device body comprises a near field communication (NFC) tag, the NFC tag contains the connection address of the wireless communication module, and the application installed in the external control terminal establishes the connection with the wireless communication module by contacting the NFC tag.

16. The 360-degree camera device according to claim 1, wherein the rotating shooting stand comprises a first connecting end and a second connecting end; the first connecting end of the rotating shooting stand is configured to connect and mount a shooting device; the shooting platform comprises a connecting portion; the camera device body further comprises a transmission piece, the transmission piece is selected from a gear group, a transmission wheel and a transmission belt group.

17. The 360-degree camera device according to claim 1, wherein application installed in the external control terminal has a face recognition function, during a shooting process of the external control terminal mounted on the rotating shooting stand around the shooting table, when the application installed in the external control terminal recognizes a face image, the application sends the control signal to the wireless communication module to make the motor decelerate.

18. A 360-degree camera device, comprising:
a camera device body;
a wireless communication module configured to receive a control signal sent by an external control terminal; and
a control system;
wherein the camera device body comprises a shooting platform, a rotating shooting stand, and a motor configured to drive the rotating shooting stand to rotate in a circumferential direction of the shooting platform;
wherein the control system comprises a microcontroller (MCU) central processing unit and a control circuit; the MCU central processing unit is provided with control instructions; the control instructions are predetermined and are programmable; the control system is electrically connected with the wireless communication module; the MCU central processing unit invokes a corresponding control instruction according to the control signal received by the wireless communication module, and the MCU central processing unit and the control circuit control the motor to drive the rotating shooting stand to rotate in the circumferential direction of the shooting platform;
wherein the shooting platform is configured for a user to stand on, the rotating shooting stand is configured to connect and mount a shooting device, the rotating shooting stand rotates in the circumferential direction of the shooting platform for 360-degree shooting process;
wherein the MCU central processing unit is arranged in a control box, and the control box is disposed on the skeleton structure.

* * * * *